(12) United States Patent
Bagdasarian

(10) Patent No.: US 7,681,958 B1
(45) Date of Patent: Mar. 23, 2010

(54) MULTI-PIECE WHEEL

(76) Inventor: Ken L. Bagdasarian, 4310 Mountain Shadows Dr., Whittier, CA (US) 90601

( * ) Notice: Subject to any disclaimer, the term of this patent is extended or adjusted under 35 U.S.C. 154(b) by 0 days.

(21) Appl. No.: 11/715,802

(22) Filed: Mar. 8, 2007

(51) Int. Cl.
B60B 1/14 (2006.01)
(52) U.S. Cl. .............................. 301/80; 301/67; 301/79
(58) Field of Classification Search ................. 301/61, 301/62, 73, 74, 79, 80, 64.201, 64.202, 65, 301/76, 77, 78, 82, 83, 84; 152/84, 74, 80, 152/86; D12/207, 211
See application file for complete search history.

(56) References Cited

U.S. PATENT DOCUMENTS

| | | | | |
|---|---|---|---|---|
| 504,573 A * | 9/1893 | Frist | ............................ | 152/74 |
| 513,525 A * | 1/1894 | Nelson | ........................ | 152/74 |
| 766,439 A * | 8/1904 | Gilbert | ........................ | 474/196 |
| 859,370 A * | 7/1907 | Cook | .......................... | 301/84 |
| 936,708 A * | 10/1909 | Felts | ............................ | 152/94 |
| 1,021,440 A * | 3/1912 | Arnold et al. | ................. | 152/84 |
| 1,037,144 A * | 8/1912 | Holland | ....................... | 152/74 |
| 1,041,244 A * | 10/1912 | Craig | .......................... | 152/86 |
| 1,069,624 A * | 8/1913 | Martin | ........................ | 152/76 |
| 1,090,711 A * | 3/1914 | Hammack et al. | ............. | 301/67 |
| 1,115,178 A * | 10/1914 | Davis, Sr. | .................... | 152/80 |
| 1,197,254 A * | 9/1916 | Blair et al. | ..................... | 152/84 |
| 1,202,939 A * | 10/1916 | White et al. | ................... | 152/39 |
| 1,240,003 A * | 9/1917 | Anderson | .................... | 301/5.1 |
| 1,262,902 A * | 4/1918 | Allen | .......................... | 152/74 |
| 1,262,903 A * | 4/1918 | Allen | .......................... | 152/74 |
| 1,318,475 A * | 10/1919 | Benjamin | .................... | 152/84 |
| 1,347,183 A * | 7/1920 | Smith | .......................... | 152/74 |
| 1,398,558 A * | 11/1921 | Lachman et al. | .............. | 301/79 |
| 1,455,332 A * | 5/1923 | Gibson | ........................ | 301/79 |
| 1,468,085 A * | 9/1923 | Schenck et al. | ............... | 301/65 |
| 1,481,253 A * | 1/1924 | Cohen | .......................... | 152/72 |
| 1,483,398 A * | 2/1924 | Whitehead | ................... | 301/104 |
| 1,588,494 A * | 6/1926 | Putnam | ........................ | 301/79 |
| 1,662,581 A * | 3/1928 | La Brie | ........................ | 301/6.6 |
| 1,678,669 A * | 7/1928 | Collier | ........................ | 301/5.1 |
| 1,748,405 A * | 2/1930 | Benjamin | ..................... | 301/74 |
| 1,816,351 A * | 7/1931 | Adams | ......................... | 301/80 |
| 2,104,112 A * | 1/1938 | Barratt | .................. | 301/64.201 |
| 2,140,431 A * | 12/1938 | Morphew | ..................... | 152/86 |
| 2,869,608 A * | 1/1959 | Chamberlin et al. | ........... | 152/86 |
| 4,181,365 A * | 1/1980 | Kawaguchi et al. | ........... | 301/67 |

(Continued)

FOREIGN PATENT DOCUMENTS

EP    1186444 A2 *    3/2002

Primary Examiner—Russell D Stormer
(74) Attorney, Agent, or Firm—Thomas I. Rozsa

(57) ABSTRACT

A multi-piece wheel, which is assembled with multiple pieces of pre-made structural members, including an outer wheel ring, a central hub and multiple spokes. The outer wheel ring is comprised of a circular wall for affixing a tire on its inner surface and connecting spokes on its outer surface. The spokes are the wheel intermediate members which at their respective first and second end are connected to the respective outer wheel ring and the central hub. The central hub is a circular structure including a central bore and front circular arcuate surface, wherein multiple pockets are placed on the front surface for connecting the spoke second ends to the central hub. Various structural variations of the central hub and spokes regarding their connection are also disclosed, which results in various embodiments of the present invention.

19 Claims, 8 Drawing Sheets

U.S. PATENT DOCUMENTS

| | | | |
|---|---|---|---|
| 4,256,346 A * | 3/1981 | Kawaguchi et al. | 301/79 |
| 5,938,291 A | 8/1999 | Pankhurst et al. | |
| 6,024,415 A * | 2/2000 | Stach | 301/64.102 |
| 6,042,194 A * | 3/2000 | Fitz et al. | 301/80 |
| D435,502 S * | 12/2000 | Donikoglu | D12/211 |
| 6,439,671 B1 * | 8/2002 | Lehnhardt et al. | 301/84 |
| 6,517,168 B1 | 2/2003 | Van Houten | |
| 6,637,828 B2 * | 10/2003 | Braunschweiler | 301/35.54 |
| 6,758,532 B2 * | 7/2004 | Rhee | 301/37.43 |
| 6,805,413 B2 | 10/2004 | Fitzgerald | |
| 6,921,138 B2 | 7/2005 | Smyth | |
| 6,955,405 B1 | 10/2005 | Hogan et al. | |
| D518,766 S | 4/2006 | Burns | |
| D520,436 S | 5/2006 | Muzzarelli | |
| 7,055,915 B2 | 6/2006 | Fitzgerald | |
| 7,059,685 B2 * | 6/2006 | Kermelk et al. | 301/64.101 |
| 2005/0073191 A1 | 4/2005 | Gerard | |

* cited by examiner

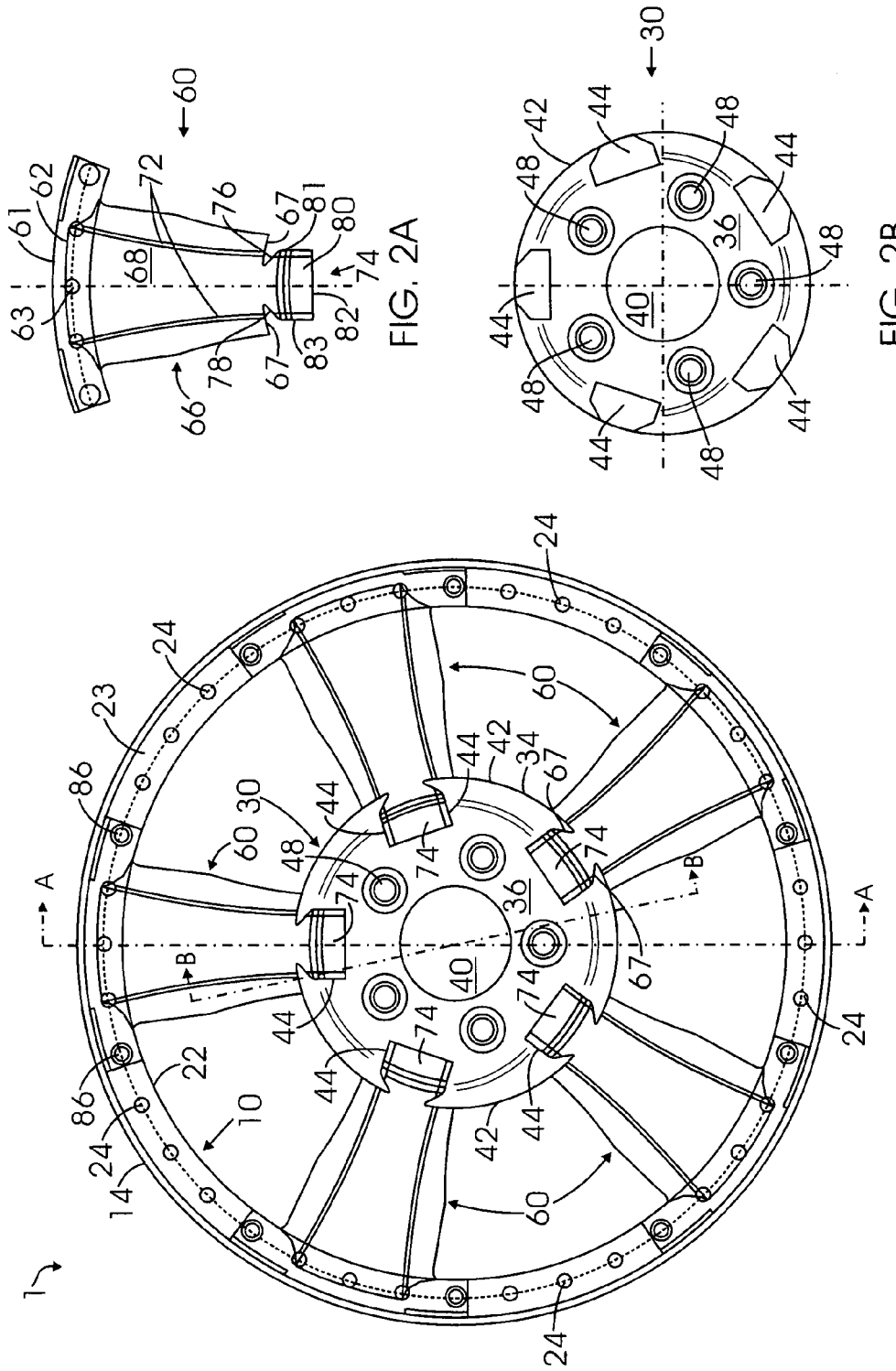

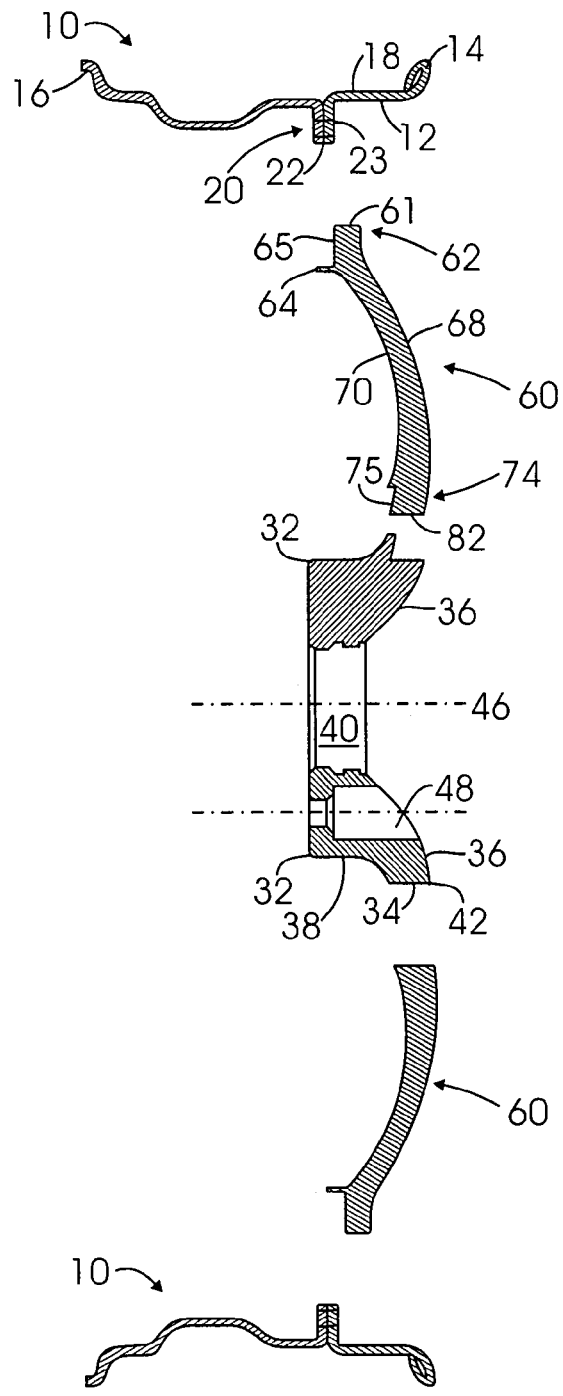
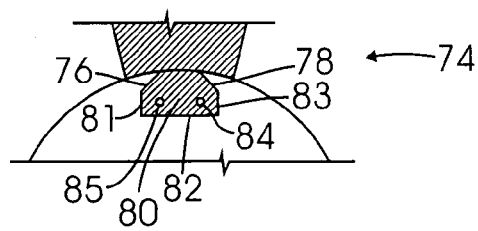
FIG. 3A
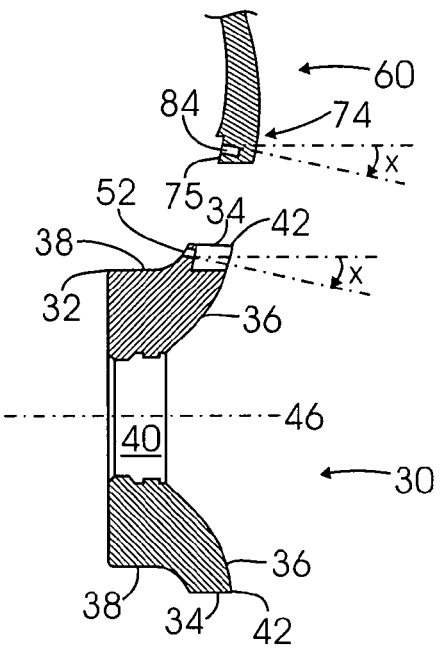
Section B-B
FIG. 3B
Section A-A
FIG. 2

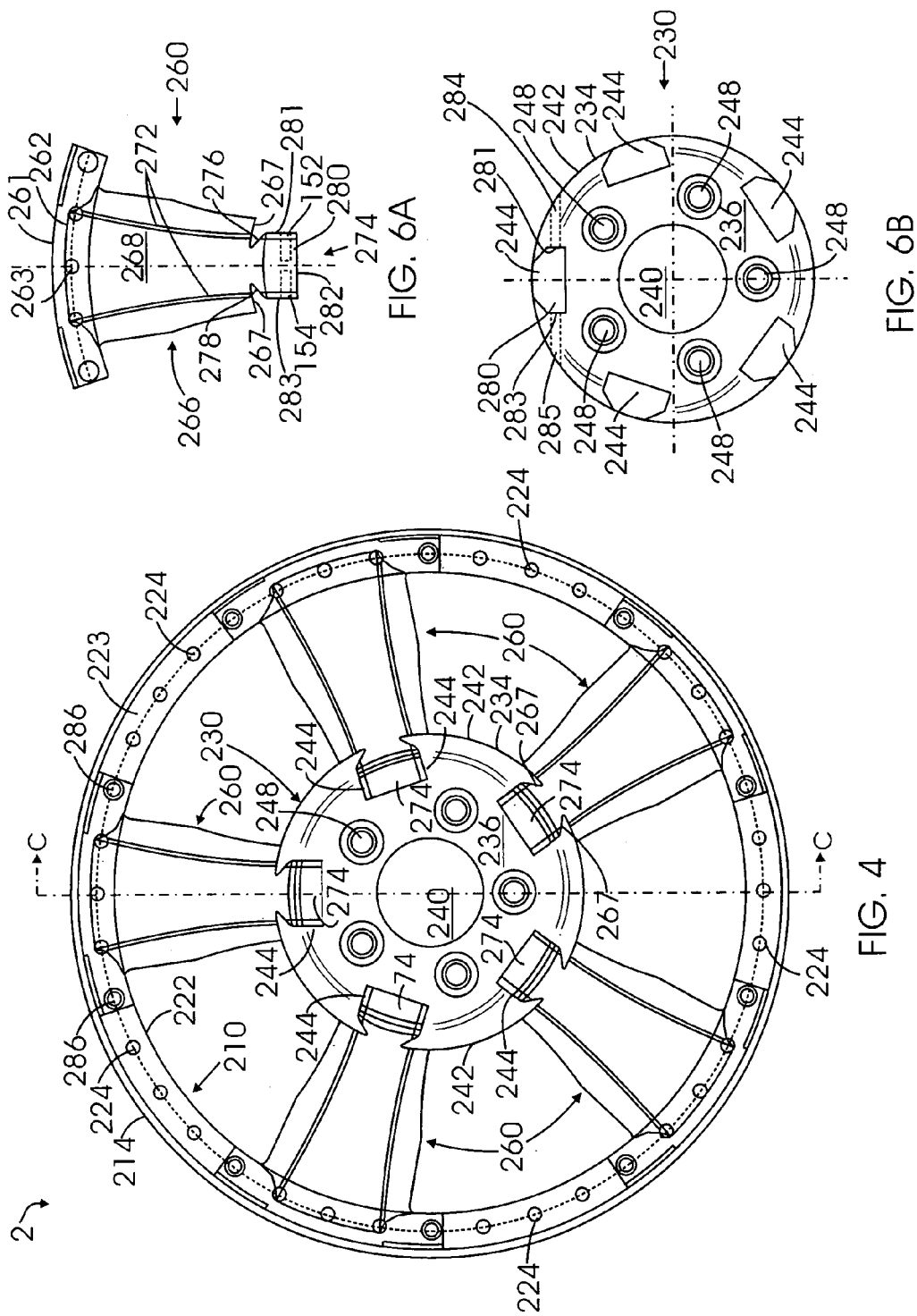

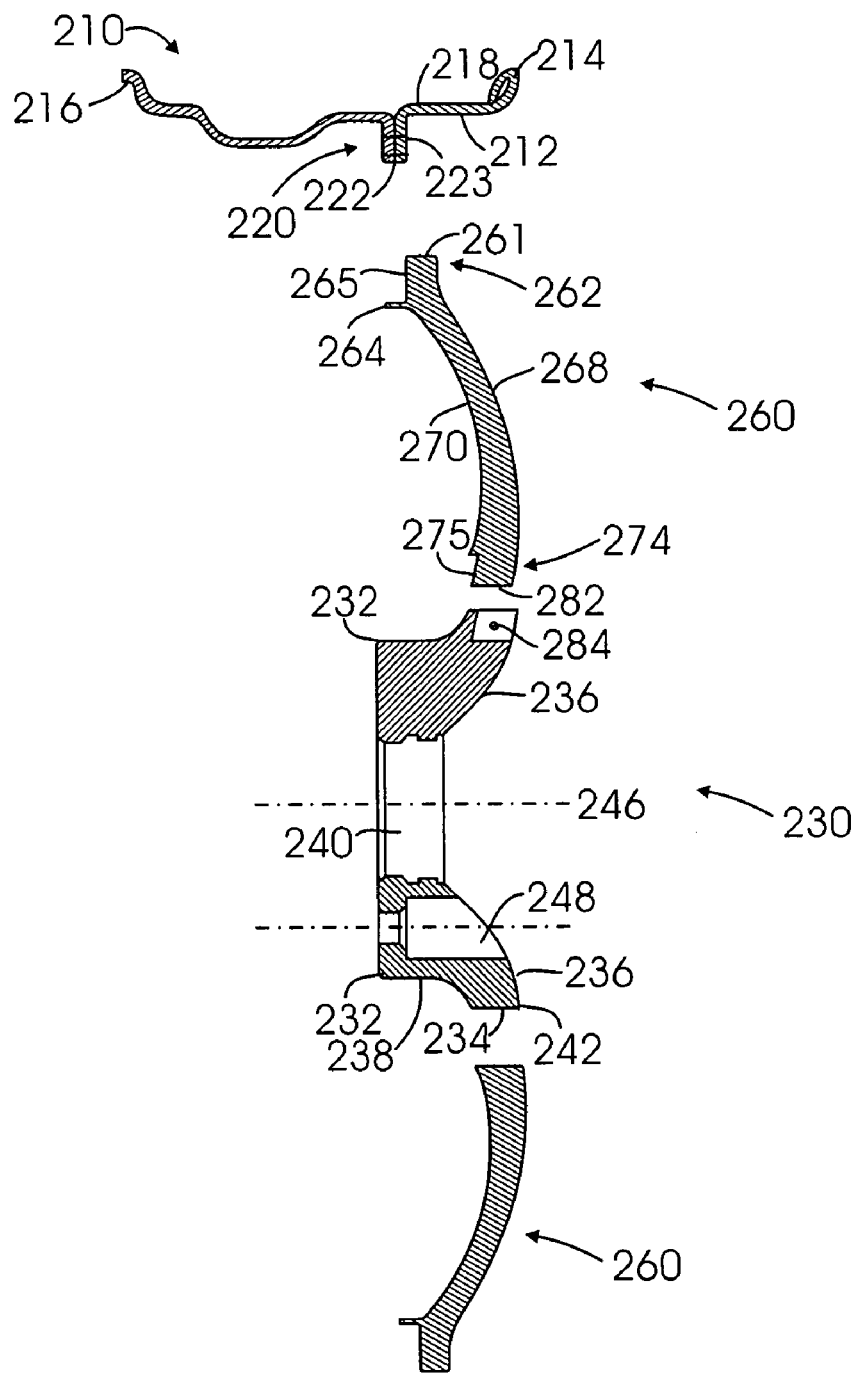
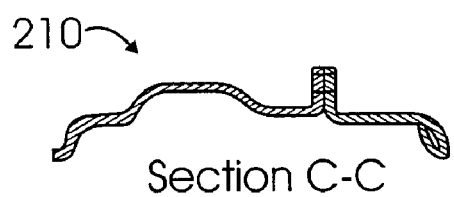
Section C-C
FIG. 5

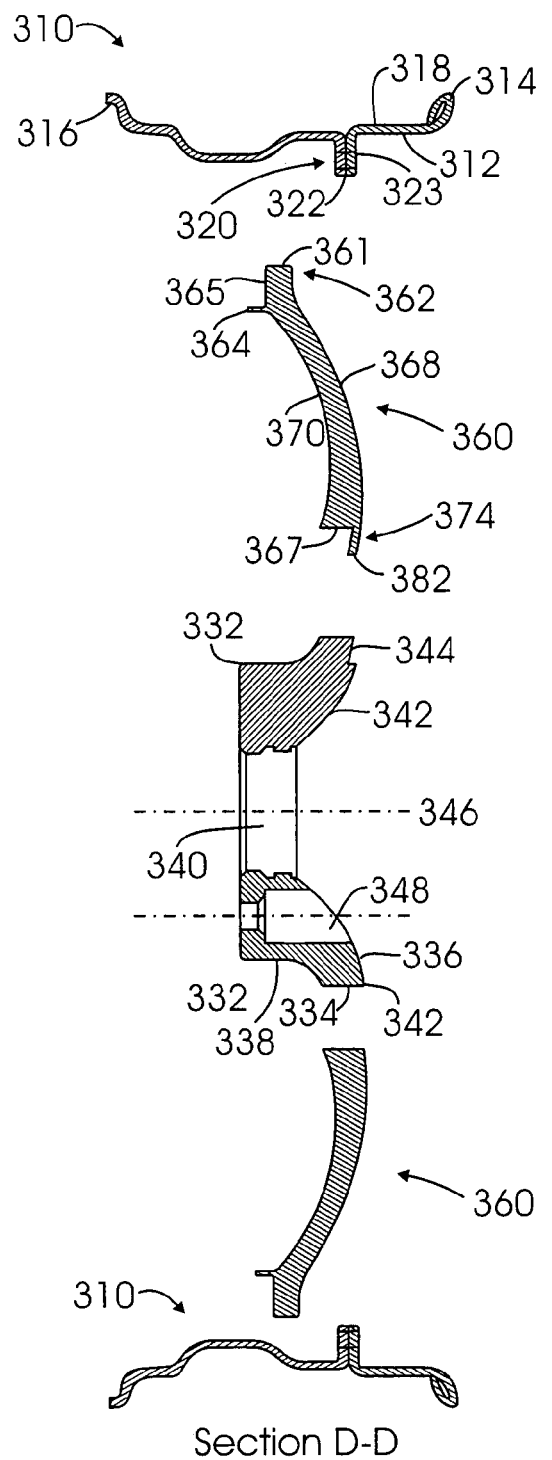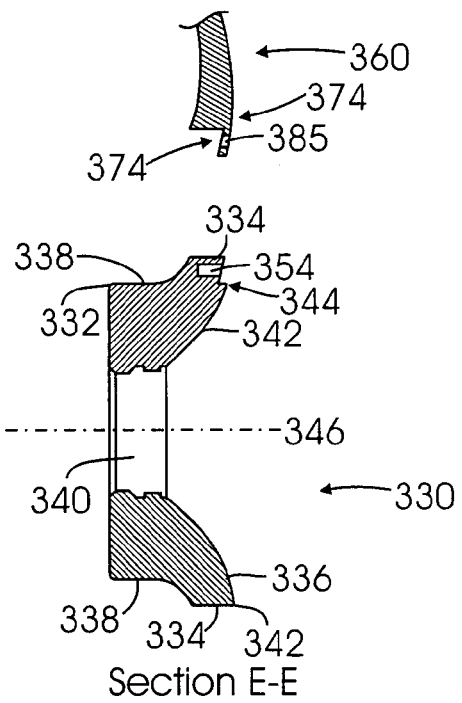
Section E-E
FIG. 9
Section D-D
FIG. 8

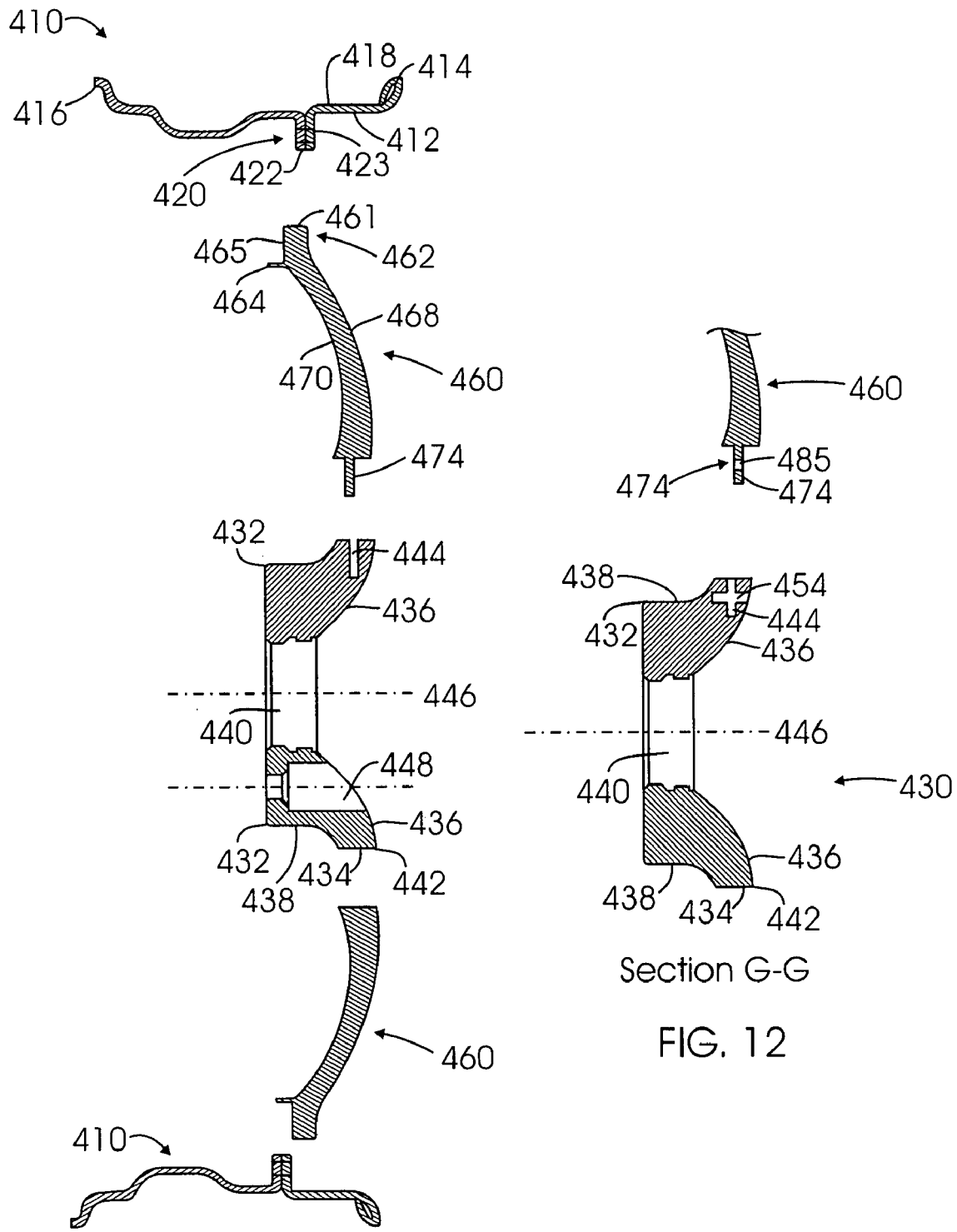

MULTI-PIECE WHEEL

BACKGROUND OF THE INVENTION

1. Field of the Invention

The present invention is related to a vehicle wheel, and more particularly to a multi-piece wheel, which is assembled with multiple pieces of pre-made structural members, including an outer wheel ring, a central hub and multiple spokes.

2. Description of the Prior Art

The following 13 patents and published patent applications are the closest prior art references which are related to the present invention.

1. U.S. Pat. No. 5,938,291 issued to Donald Pankhurst et al. and assigned to GKN Sankey Limited on Aug. 17, 1999 for "Wheels" (hereafter the "Pankhurst Patent");

2. U.S. Pat. No. 6,517,168 issued to Garry Van Houten and assigned to Lacks Industries, Inc. on Feb. 11, 2003 for "Wheel Cover Having Interchangeable Turbine Pocket Inserts" (hereafter the "Van Houten Patent");

3. U.S. Published Patent Application No. 2004/0070259 issued to Ya-Wen Chuang on Apr. 15, 2004 for "Vehicle Wheel Assembly" (hereafter the "Chuang Published Patent Application");

4. U.S. Pat. No. 6,805,413 issued to Kevin Fitzgerald and assigned to KMC Wheel Company on Oct. 19, 2004 for "E.X.O. Rimwear" (hereafter the "'413 Fitzgerald Patent");

5. U.S. Published Patent Application No. 2005/0073191 issued to Phillip O. Gerard on Apr. 7, 2005 for "Wheel Clad Assembly" (hereafter the "Gerard Published Patent Application");

6. U.S. Pat. No. 6,921,138 issued to Larry C. Smyth on Jul. 26, 2005 for "Multi-Piece Vehicle Wheel Assembly" (hereafter the "Smyth Patent");

7. U.S. Pat. No. 6,955,405 issued to Scott A. Hogan et al. and assigned to McKechnie Vehicle Components on Oct. 18, 2005 for "Inserts For Vehicle Wheel Assemblies" (hereafter the "Hogan Patent");

8. U.S. Published Patent Application No. 2005/0242656 issued to Scott A. Hogan on Nov. 3, 2005 for "Plated Covers For Vehicle Wheel Assemblies" (hereafter the "Hogan Published Patent Application");

9. U.S. Published Patent Application No. 2005/0269864 issued to Derek Tai Tong on Dec. 8, 2005 for "Wheel And Rim Bumper" (hereafter the "Tong Published Patent Application");

10. U.S. Design Pat. No. D518,766 issued to Garry Burns on Apr. 11, 2006 for "Wheel Design" (hereafter the "Burns Design Patent");

11. U.S. Design Pat. No. D520,436 issued to Marco Muzzarelli and assigned to Claus Ettensberger Corp. on May 9, 2006 for "Front Face Of A Vehicle Wheel" (hereafter the "Muzzarelli Design Patent");

12. U.S. Pat. No. 7,055,915 issued to Kevin Fitzgerald and assigned to ZZYYXX Corp. on Jun. 6, 2006 for "Wheel With Interchangeable Cover Elements" (hereafter the "'915 Fitzgerald Patent").

The Pankurst Patent is a design for a wheel to include a wheel disc which can be attached to the wheel. The innovation is that there is a tolerance in the attachment connection so that the disc can be attached in the field.

The Van Houten Patent includes the concept of a wheel cover assembly having an array of pocket inserts which are disposed within an array of turbine pockets of a wheel cover so that the inserts can be put in the turbine pockets.

The Chuang Published Patent Application has an apparent unique feature which is a protective cover on the outer portion of the wheel. The protective cover is shown in greater detail in FIG. 3. Specifically, this is a fairly conventional wheel design having essential hub 11, plurality of spokes 12 extending radially outward from the central hub 11 and a rim 13 having a front portion 15, a rear portion 16 and an intermediate recess portion 14. The inner wall 141 of the intermediate recess portion 14 of the rim 13 includes a plurality of spaced holes 142 in which a plurality of decorative bulbs 143 are inserted.

The '413 Fitzgerald Patent discloses an innovation for changing the appearance of the wheel. Specifically, the wheel has a multiplicity of spokes which can be in any orientation and has various openings to accommodate what is referred to as a decorative skin such as 54 shown in FIG. 3A and 102 shown in FIG. 7A which is mounted to the spokes so that the physical outward appearance of the wheel can be changed.

The Gerard Published Patent Application discloses a composite wheel that includes the wheel having an outer surface with a plurality of exposed apertures formed in a circular pattern in a central hub region of the wheel and centrally located aperture extending through the wheel. The composite wheel includes a wheel cladding which is the innovative feature of this invention having a body conforming to the outer surface of the wheel and exposed outer surface of an inner surface facing the wheel when the wheel cladding is attached to the wheel.

The Smyth Patent discloses a multi-piece wheel assembly. The innovation is the inside major surface of the rim having an inwardly extending annual shoulder and a plurality of circumferentially spaced rim bosses formed in the annual shoulder and adopted for engaging the outer margins of the wheel center. A plurality of circumferentially spaced fastener holes are formed along the outer margins of the wheel center and are adopted for aligning with the rim bosses formed in the rim.

The '405 Hogan Patent discloses a concept of inserts for a vehicle wheel assemblies. Essentially the concept, referring to FIG. 2, is to have a wheel 2 and a wheel cover 3 which is affixed to the outer surface of the wheel cover. The concern that this patent deals with is there are gaps between the wheel cover and the wheel and which the existence of the gaps is believed to be a problem. As a result, the problem is solved by including inserts 20 within these gaps.

The Hogan Published Patent Application deals with plated covers for vehicle wheel assemblies. It involves a method of fabricating decorative wheel covers which involves forming decorative wheel covers that have sharp edges such as edges along break vent windows or openings. The shape edges are dull by subjecting the wheel covers to a plating process that plates both sides of the wheel covers. The plating process rounds off or dulls the sharp edges of the wheel covers. The ability to dull the sharp edges of the wheel covers allows for the design and fabrication of metal wheel covers having profiles that push the limits on formability of metals such as stainless steel. Therefore, it is this plating process that is the innovation of this invention.

The Tong Published Patent Application is focused on the wheel and rim bumper which is an attachable accessory to a wheel for purposes of protecting the decoration of the wheel. It provides a bumper to protect the wheel so that the wheel will not be scratched during parking.

The Burns Patent is a design patent which protects the decorative appearance of the wheel.

The Muzzarelli Patent is also a design patent and again protects the decoration of the front face of a vehicle wheel.

The '915 Fitzgerald Patent is a continuation of the previously discussed '413 Fitzgerald Patent. This has a similar disclosure to the previously discussed patent and again deals with the concept of having the decorative skins attached to the spokes of the wheel to give the wheel a unique and attractive appearance.

There is a significant need to provide a multi-piece wheels which can be assembled with multiple pieces of pre-made structural members, to significantly improve wheel styling potential, and to reduce the cost to manufacture the stylish wheels.

SUMMARY OF THE INVENTION

The present invention is a multi-piece wheel, which facilitates changing the wheel styling and which can be achieved at a reduced manufacturing cost. The wheel is assembled with multiple pieces of pre-made structural members including an outer wheel ring, a central hub and a multiplicity of spokes. The outer wheel ring is comprised of a generally circular cylindrical wall having a tire receiving inner surface and an outer circular surface. A circular bolt receiving shoulder is transversely affixed onto the outer wheel ring at its outer circular surface, wherein a multiplicity of identical exposed bolt receiving transverse threaded apertures are evenly spaced in a circular pattern in the bolt receiving shoulder to penetrate through the shoulder for connecting of a multiplicity of identical spokes.

Each spoke is a generally "T" shaped arcuate structure, comprising a round wide transverse first end which is connected to an intermediate arcuate elongated member having an arcuate outer and inner surface extending forwardly to an exterior side, which is further connected to a narrow spoke second end. Multiple identical transverse bolt receiving openings are arcuately spaced on the round wide spoke first end. Each of the transverse bolt receiving openings respectively matches every threaded aperture on the shoulder of the wheel ring for connection of the spoke to the wheel ring. The narrow spoke second end is comprised of a rectangle which is further combined with a dovetail shaped member, wherein first and second identical descending bolt receiving threaded holes are positioned from an inner side to inside of the spoke second end for connection of the spoke to the central hub.

The central hub is comprised of a central bore which is a circular structure comprising a rear cylindrical top circumference, which extends outwardly to form a side circular arcuate surface which in turn is further connected to a side cylindrical surface having a front exterior circumference. A front arcuate circular surface is connected to the central bore and the front exterior circumference, wherein a multiplicity of identical lug nut receiving apertures are circumferentially spaced adjacent to the hub central bore, and a multiplicity of identical pockets are evenly and circularly placed close to the front exterior circumference. Each pocket matches each spoke second end for connection of spokes to the central hub. Two identical descending bolt receiving holes from the side arcuate surface penetrate through the pocket, which respectively match the descending threaded holes on the spoke second end for connection of the spoke and central hub. Various structural variations related to the connection of the spokes and central hub are disclosed, which result in a multiplicity of embodiments of the present invention.

It is an object of the present invention to provide a multi-piece wheel, which is assembled with multiple pieces of pre-made structural members including an outer wheel ring, a central hub and multiple spokes, so that the styling and appearance of the multi-piece wheel can be changed. The present invention also facilitates a reduced cost to manufacture the stylish wheels.

It is an another object of the present invention to provide an outer wheel ring, which is a generally circular cylindrical wall having an outer circular surface to which is affixed a bolt receiving circular transverse shoulder having a multiplicity of evenly positioned identical transverse bolt receiving threaded apertures for affixing the multiplicity of identical spokes. Each spoke is a generally "T" shaped arcuate structure comprising a round wide transverse first end having a multiplicity of identical transverse bolt receiving holes to connect to an intermediate arcuate elongated member, which in turn is further connected to a narrow spoke second end. Every identical transverse bolt receiving hole on the spoke first end respectively matches a threaded aperture on the wheel ring shoulder, so that the wheel ring can be securely connected to the spokes through affixation of bolts to the corresponding threaded holes of the wheel ring where the bolts respectively penetrate through the corresponding bolt holes of the spokes in assembling the multi-piece wheel of the present invention.

It is a further object of the present invention to provide a central hub having a central bore, which is a circular structure comprising a rear cylindrical top circumference. The rear cylindrical top circumference extends outwardly to form a side circular arcuate surface which connects to a side cylindrical surface having a front exterior circumference. A front arcuate circular surface is connected to the central bore and the front exterior circumference, where five identical pockets are evenly and circularly placed adjacent to the front exterior circumference. Each identical pocket respectively matches each identical spoke second end. Two identical descending bolt receiving holes from the side arcuate surface penetrate through the pocket of the central hub to respectively match the descending threaded holes on the second end of the spoke so that the central hub can be securely connected to the spokes through the respective matching of a hub every pocket to a spoke second end. In addition, the bolts are affixed to the corresponding threaded holes of the spokes through the corresponding bolt holes of the central hub.

It is an additional object of the present invention to provide various structural variations, which are related to the connection of the spokes and central hub, so that such variations facilitate construction of various embodiments of the multi-piece wheel of the present invention.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a front view of a multi-piece wheel for vehicles according to a first embodiment of the present invention;

FIG. 2 is a cross-sectional exploded view of the first embodiment of the multi-piece wheel taken along line A-A of the wheel in FIG. 1;

FIG. 2A is an elevational front view of a spoke from the first embodiment of the present invention;

FIG. 2B is an elevational front view of a central hub from the first embodiment of the present invention;

FIG. 3A is an elevational rear view for a part of the spoke including the spoke second end to illustrate two descending bolt receiving threaded holes located on the second end of the spoke;

FIG. 3B is an elevational cross-sectional exploded view of the central hub and a partial spoke from the first embodiment of the multi-piece wheel taking along line B-B of the FIG. 1, to illustrate a descending bolt receiving threaded hole located on the spoke second end, and a descending bolt receiving hole to penetrate through a pocket of the central hub;

FIG. 4 is a front view of a multi-piece wheel for vehicles according to a second embodiment of the present invention;

FIG. 5 is a cross-sectional exploded view of the second embodiment of the multi-piece wheel taken along line A-A of the wheel in FIG. 4;

FIG. 6A is an elevational front view of a spoke from the second embodiment of the present invention;

FIG. 6B is an elevational front view of a central hub from the second embodiment of the present invention;

FIG. 8 is a cross-sectional exploded view of the third embodiment of the multi-piece wheel taken along line D-D of the wheel in FIG. 7;

FIG. 9 is a cross-sectional exploded view of the spoke second end and the central hub taken along line E-E of the wheel in FIG. 7;

FIG. 11 is a cross-sectional exploded view of the fourth embodiment of the multi-piece wheel taken along line F-F of the wheel in FIG. 10;

FIG. 12 is a cross-sectional exploded view of the spoke second end and the central hub taking along line G-G of the wheel in FIG. 10.

DETAILED DESCRIPTION OF THE PREFERRED EMBODIMENTS

Figure 8A:
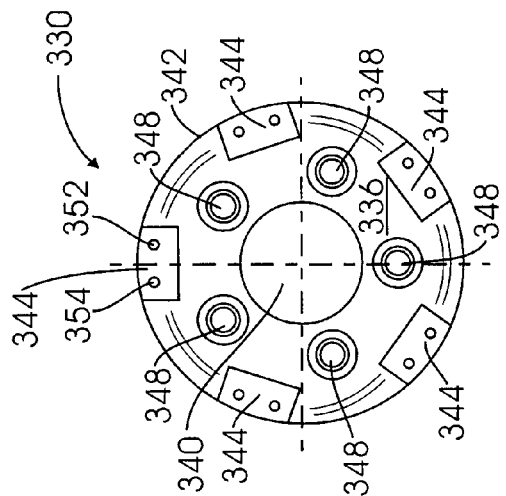
FIG. 8A is an elevational front view of a central hub from the third embodiment of the present invention.

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

The present invention is a multi-piece wheel, which is assembled with a multiplicity of pieces of pre-made structural members, including an outer wheel ring, a central hub and multiple identical spokes. The outer wheel ring is comprised of a circular wall for affixing a tire on its inner surface and connecting spokes on its outer surface. The spokes are the wheel intermediate members which at their respective first and second end are connected to the respective outer wheel ring and the central hub. The central hub is a circular structure including a central bore and front circular arcuate surface, wherein multiple pockets are placed on the front surface for connecting the spoke second ends to the central hub. Various structural variations of the central hub and spokes regarding their connection are also disclosed, which result in various embodiments of the present invention.

Referring to FIGS. 1 and 2A, there is illustrated a first embodiment 1 of the multi-piece wheel of the present invention, which has a central rotational axis 46. The wheel is assembled from a multiplicity of pre-made structural members, including an outer wheel ring 10, a central hub 30 and a multiplicity of identical spokes 60.

Referring to FIG. 2, the outer wheel ring 10 is comprised of a generally circular cylindrical wall having a tire receiving inner surface 18 and an outer circular surface 12 to connect to a respective outer and inner rim 14 and 16. A bolt receiving circular shoulder 20 is transversely affixed onto the outer circular surface 12 of the outer wheel ring 10 of positioned adjacent to its outer rim 14. The shoulder 20 includes an exterior circular cylindrical edge 22 and an outer ring surface 23. As illustrated in FIG. 1, a multiplicity of identical exposed bolt receiving transverse threaded apertures 24 are evenly spaced in a circular pattern on the outer ring surface 23 and which penetrate through the bolt circular receiving shoulder 20 to facilitate connecting the multiplicity of identical spokes 60.

Referring to FIGS. 2 and 2A, each identical spoke 60 is a generally "T" shaped arcuate structure, comprising a round wide transverse first end 62, which is connected to an intermediate arcuate elongated member 66 having an arcuate outer and inner surface 68 and 70 extending forward to an exterior side 67, which is further connected to a narrow second end 74 of the spoke. The connection of the spoke second end 74 causes the intermediate member 66 containing the exposed edge 67 to face toward the central hub 30. In addition, two raised edges 72 on the outer arcuate surface 68 of the intermediate member 66 are radially located and extend toward the second end 74 to act as two strengthening ribs of the spoke.

The spoke round wide transverse first end 62 is illustrated in FIGS. 1 and 2 to be a structure designed as a segment of a flat ring, which has an outer arcuate end side 61 and an inner flat side 65. A round wide transverse wall 64 of the spoke 60 is placed at a joint, where the inner side 65 of the spoke round wide first end 62 is connected to the inner arcuate surface 70 of the spoke intermediate arcuate member 66, and from which the inner surface 70 of the intermediate member 60 begins to extend toward the spoke second end 74. In addition, five identical transverse bolt receiving openings 63 are arcuately spaced on the center of the round wide first end 62.

It will be appreciated that when the spoke 60 at its first end 62 is radially connected to the wheel ring 10, the outer arcuate end side 61 of the spoke first end 62 matches the outer surface 12 of the wheel ring 10, and the flat rear side 65 and the round wide transverse wall 64 of the spoke 60 matches the respective outer ring surface 23 and exterior edge 22 of the bolt receiving circular shoulder 20 of the wheel outer ring 10. In this setting, every bolt transverse receiving opening 63 of the spoke 60 matches every bolt transverse receiving threaded aperture 24 on the bolt receiving circular shoulder 20 of the wheel ring 10, and the narrow second end 74 of each identical spoke 60 is extending radially towards the central hub 30 for the first embodiment 1 of the multi-piece wheel.

The narrow second end 74 having an inner side 75 is comprised of a rectangle 80 having an elongated exterior edge 82, and a right and left short side 81 and 83, wherein the rectangle 80 is further combined with a dovetail shaped member having a first and second side 76 and 78. The two sides 76 and 78 extend at an angle from the respective rectangular right and left side 81 and 83 toward each other. In addition, as illustrated in FIGS. 3A and 3B, a first and second identical descending bolt receiving threaded hole 84 and 85 are placed from the inner side 75 to inside of the spoke second end 74 for connection of the spoke 60 to the central hub 30, however the holes do not completely penetrate through the spoke second end 74 to thereby provide for ornamentation of the multi-piece wheel to provide a visual effect in the front view of the wheel.

The central hub 30 is illustrated in FIGS. 1, 2 and 2B to be a circular structure having a central bore 40, wherein a rotation axis of the hub including its central bore is aligned with the wheel rotational axis 46. The hub circular structure is comprised of a rear cylindrical top circumference 32, which extends outwardly to form a side circular arcuate surface 38. The side surface 38 is further connected to a side cylindrical surface 34 having a front exterior circumference 42, wherein the front circumference 42 is larger than the rear cylindrical top circumference 32. As illustrated, a front arcuate circular surface 36 is connected to the central bore 40 and the front exterior circumference 42. On the front circular arcuate surface 36, five identical lug nut receiving apertures 48 are circumferentially spaced and further located adjacent to the hub central bore 40. The apertures 48 are spaced for a particular vehicle on which the wheel can be employed, wherein the rotational axis of each aperture 48 is parallel to the wheel rotational axis 46.

In addition to the lug nut receiving apertures, five identical pockets 44 are evenly arranged in a circular pattern on the front circular arcuate surface 36 close to the front exterior circumference 42. As illustrated, each identical pocket 44 matches the second end 74 of each spoke 60, which provides a secure connection between the central hub 30 and the spokes 60. In addition, the exposed edge 67 of each spoke 60 matches the cylindrical side 34 of the central hub 30, which also provide a secure connection of the central hub and spokes.

It will be appreciated that an additional security of the connection between the central hub 30 and each spoke 60 is provided with respective affixation of two bolts to two corresponding descending threaded holes of each spoke 60 through two respective descending bolt receiving holes. Referring particularly to FIG. 3B which is a cross-sectional view taking along line B-B of the wheel depicted in FIG. 1, it illustrates how the central hub 30 is affixed to the spoke 60 through such bolt and threaded hole affixation. The first descending bolt receiving threaded hole 84 partially penetrates into the spoke second end 74 from its inner side 75 with a descending angle "X", which is relative to the rotational axis 46 of the wheel. For matching the threaded hole 84, a first descending bolt receiving hole 52 penetrates through the hub pocket 44, aligning with the first descended bolt receiving threaded hole 84 on the spoke second end 74, wherein the penetration begins at a position of the central hub side arcuate surface 38 close the joint where the side arcuate surface 38 joins the side cylindrical surface 34. A second descending bolt receiving hole (not shown) is arranged to penetrate through the central hub 30 in the same manner as disclosed for the first bolt receiving hole 52, so that it matches a second descending bolt receiving threaded hole 85 at the second end 74 of the spoke 60, wherein the second descending bolt receiving threaded hole 85 is constructed identically to the first threaded hole 84. Therefore, two bolts can be applied to complete the bolt and threaded hole affixation between the spoke 60 and the central hub 30 for providing the additional connection security, in addition to the security of the connection which is brought from the mating of the spoke second end 74 and the pocket 44 of the central hub 30.

In assembling the first embodiment 1 of the multi-piece wheel, first five identical spokes 60 are circumferentially spaced to connect the outer wheel ring 10. For connection of each spoke 60, it will be appreciated that five identical bolts 86 are applied to pass through the corresponding five transverse bolt receiving openings 63 on the spoke round wide transverse first end 62 to connect the respective five identical transverse bolt receiving threaded apertures 24 on the bolt receiving circular shoulder 20 of the outer wheel ring 10.

Second the central hub 30 is then connected to the five spokes 60. Each spoke second end 74 is first installed into each corresponding pocket 44 of the central hub 30, and then the second end 74 of each spoke is additionally affixed by applying two bolts to connect the respective descending bolt receiving threaded holes 84 and 85 of the spoke through the respective bolt receiving holes 52 and 54 of the central hub 30. It will be appreciated that having the structural features of the bolt and threaded hole affixation disclosed above provides ornamentation to the multi-piece wheel since there are no visible bolt heads in the area where each spoke 60 joins the central hub 30.

It will be appreciated that the above disclosure illustrates the first embodiment 1 of the multi-piece wheel, in accordance with the principle and scope of the present invention, which apply multiple pre-made structural members to assemble the wheel. Therefore, various structural variations are readily available for the first embodiment 1. For example, at least three spokes 60, instead of five can be applied to achieve the equivalent result of the multi-piece wheel illustrated in the first embodiment 1. In addition, at least three transverse bolt receiving openings 63 can be applied on the round wide transverse first end 62 of each spoke 60. Further, the spoke 60 is not limited to be the generally "T" shape. In fact, any shaped spoke means is effective so long as it is comprised of an intermediate member to connect a respective first and second end. As to the connection of the central hub, any means which can result in a secure connection and an easy disconnection between the central hub member and spoke members, are within the spirit and scope of the present invention.

It will be appreciated that the multi-piece wheel from the present invention, which can be assembled with multiple pre-made structural members, has a flexibility to change the wheel styling through changing one or several of the structural members. Such flexibility is a significant advantage to overcome a disadvantage of the prior art one-piece wheel having a fixed styling. In addition, a low cost to manufacture the stylish wheels is also achieved by the mechanism having the multiple pre-made wheel structural members of the present invention.

In summary, the concept is to have a wheel ring which supports a tire and an interchangeable hub and an interchangeable set of spokes so that the interchangeable components can be mixed and matched to provide an infinite variety of shapes and numbers of spokes in combination with a central hub and outer wheel ring.

Referring to FIGS. 4 to 12 illustrates additional embodiments 2, 3 and 4 of the present invention, which have structural features designated with three-digit numerals. It will be appreciated that the additional embodiments of the present invention have structural variations as compared to the first embodiment 1, which are only related to the connection mechanisms between the spoke second ends and the central hub. For this reason, the following disclosures of the embodiments 2, 3 and 4 will not repeat features of the wheel structural members shown in the figures, which are the same as those shown for the embodiment 1. However, those features of the embodiments 2, 3 and 4 will be designated with three-digit numerals. The part numbers are the same with the addition of a 200, 300 or 400 to the part number to differentiate those same features in the respective embodiments 2, 3 and 4.

As illustrated in FIGS. 4 to 6B, the second embodiment 2 is comprised of an outer wheel ring 210, a central hub 230 and multiple identical spokes 260, wherein the embodiment 2 has the same structural features as those of the first embodiment 1, except for a different kind of the bolt and threaded hole affixation to secure the connection between the spoke second ends 274 and central hub 230.

Referring particularly to FIGS. 5 and 6B, there is illustrated a first and second bolt receiving hole 284 and 285 inside of the central hub 230, which are shown in dotted lines. The first bolt receiving hole 284 is transverse to a diameter of the hub exterior circumference 242, wherein the diameter is aligned with the A-A line to evenly divide a pocket 244 including its elongated inner edge 282 of a rectangular portion 280 of the pocket. The first bolt receiving hole 284 is further illustrated to be placed parallel to a plane defined by the hub exterior circumference 242, and penetrate an edge portion of the circular central hub 230. It passes through the hub cylindrical side surface 234 and a right short side 281 of the pocket rectangular portion 280. Similarly, the second bolt receiving hole 285, which is a mirror image to the first bolt receiving hole 284, is transverse to the diameter, and penetrates through the hub cylindrical side surface 234 and a left short side 283 of the pocket 244.

It will be appreciated that the first and second bolt receiving holes 284 and 285 are used for affixing the central hub 230 and the spoke second end 274, therefore, there must be respective bolt receiving threaded holes inside of the spoke second end 274 to mate with the holes 284 and 285. For matching the first bolt receiving hole 284, a first bolt receiving threaded hole 152 is constructed, which is illustrated in FIG. 6A with dotted lines. The threaded hole 152 is illustrated to be placed inside of a right half of a rectangle 280 of the spoke second end 274, and further parallel to the outer edge 282 of the rectangle 280. Similarly, a second bolt receiving threaded hole 154, which is a mirror image of the threaded hole 152, is constructed to match the second bolt receiving hole 285 of the central hub 230. It will be also be appreciated that with design of the above disclosed bolt and threaded hole features to affix the spokes to the central hub, the second embodiment 2 will have the same ornamentation features as the first embodiment 1 of the present invention the multi-piece wheel.

Figure 7:
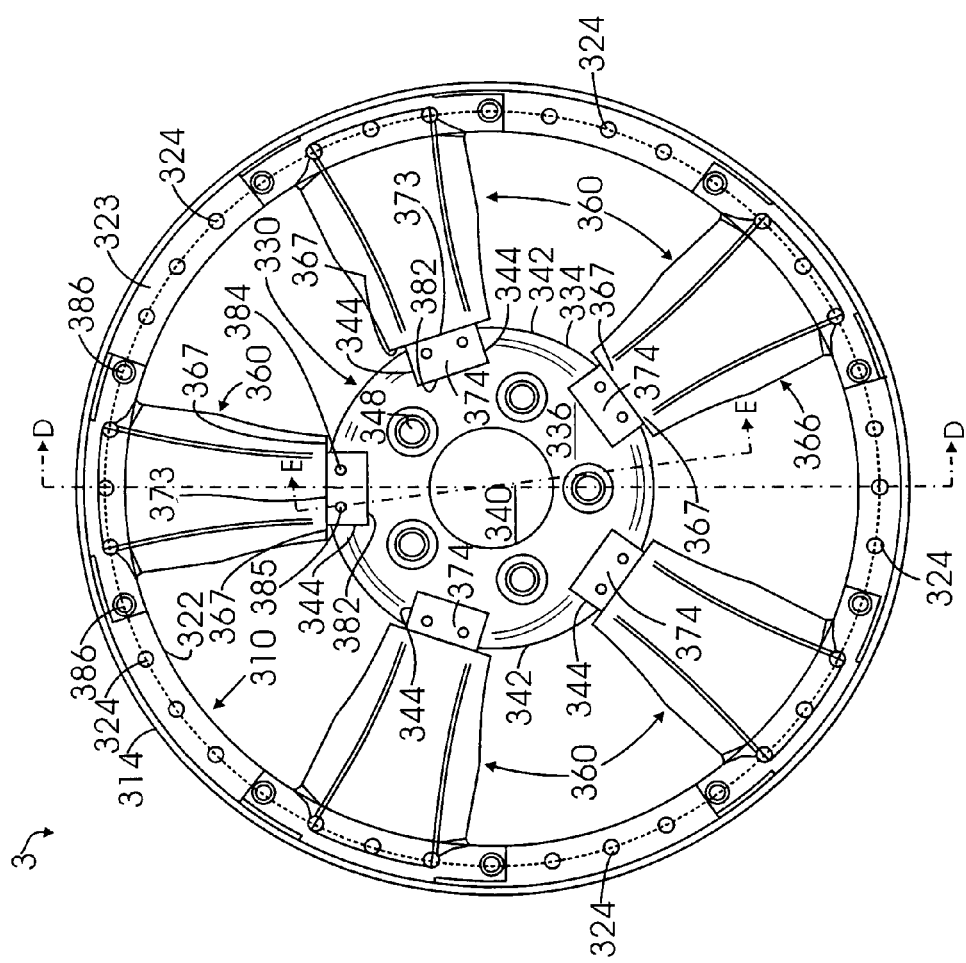
FIG. 7 is a front view of a multi-piece wheel for vehicles according to a third embodiment of the present invention.

The embodiment 3 employs multiple identical spokes 360 to have the second ends 374, which are structurally different from the second spoke ends of the embodiments 1 and 2. As illustrated in FIGS. 7 to 9, a rectangular shoulder having an exterior elongated edge 382 acts as the second end 374 at its elongated side 373 and is connected to an exterior edge 367 of the spoke intermediate arcuate member 366, wherein a center of the elongated side 373 is aligned with a center of the exterior side 367 of the spoke intermediate member 366. Further referring to the illustration of FIG. 8, the second end 374 is connected, wherein its top rectangular surface is aligned with an arcuate outer surface 368 of the intermediate arcuate member 366. In addition, as illustrated in FIGS. 7 and 9, a first and second identical transverse bolt receiving hole 384 and 385 are symmetrically placed to penetrate through the second end 374.

Accordingly, for connection of the spoke second ends 374, which is introduced in FIG. 7, five identical rectangular pockets 344 are evenly arranged in a circular pattern on an outer circular arcuate surface 336 of the central hub 330, which are further close to the hub front exterior circumference 342. Referring to FIG. 8A, a first and second transverse bolt receiving threaded hole 352 and 354 are placed onto each pocket 344, which partially penetrate into the central hub 330 close to the hub front exterior circumference 342, to match the respective first and second transverse bolt receiving hole 384 and 385 on the second end of each spoke. Therefore, with the aid of the matching between each spoke second rectangular end 374 and rectangular pocket 344, and affixing by two bolts through the bolt receiving holes 384 and 385 to connect the respective bolt receiving threaded holes 352 and 354, each spoke 360 at its second end 374 can be securely connected to the central hub 330 for the third embodiment 3 of the present invention.

It will be appreciated that the rectangular second ends 374 of the five spokes in the embodiment 3 can be differently placed to connect the spoke intermediate arcuate members 366. This results in the fourth embodiment 4 of the present invention.

Figure 11A:
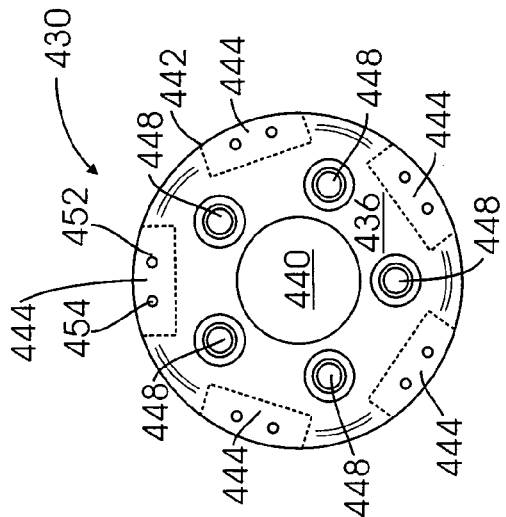
FIG. 11A is an elevational front view of a central hub from the fourth embodiment of the present invention.
Figure 10:
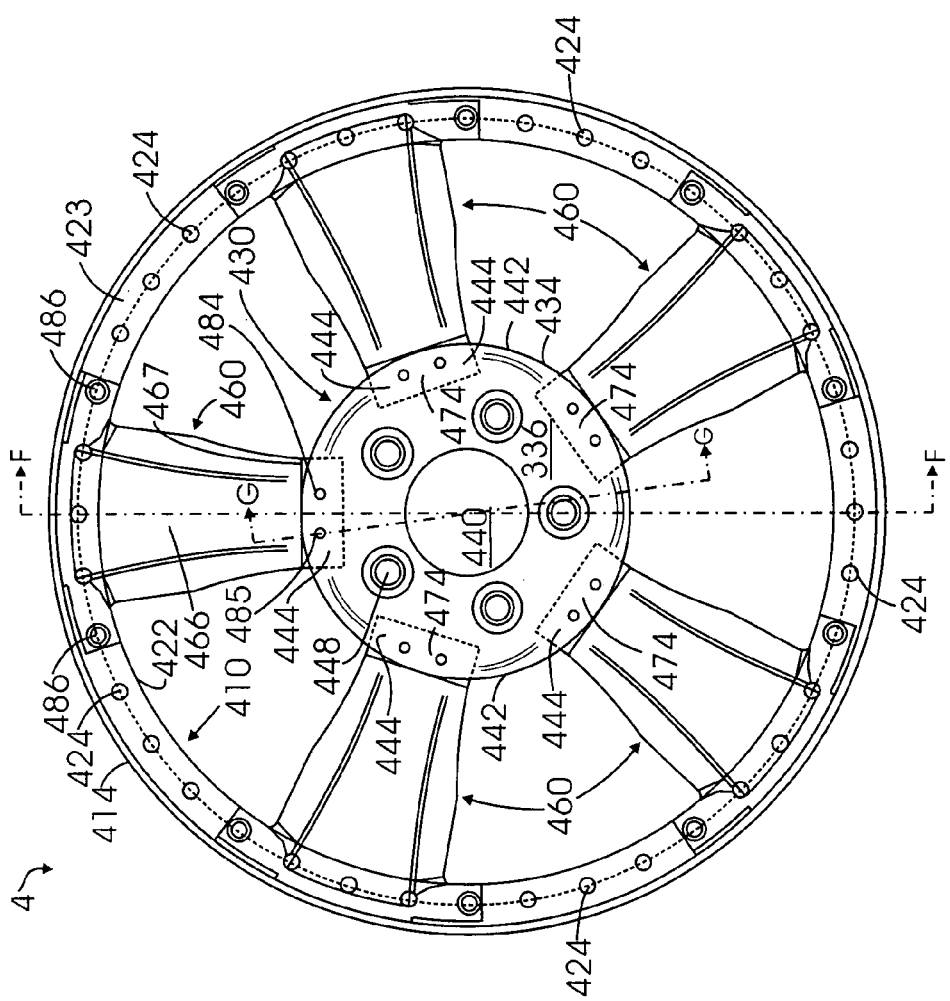
FIG. 10 is a front view of a multi-piece wheel for vehicles according to a fourth embodiment of the present invention.

Referring to FIGS. 10 through 12 illustrates that a second end 474 of each identical spoke 460, which is a flat rectangular shoulder, at its elongated side is connected to an exterior edge 467 of the intermediate arcuate member 466, wherein the length of the side matches the length of the edge. In addition, it further illustrates that first and second identical transverse bolt receiving holes 484 and 485 are symmetrically placed to penetrate through the spoke second end 474. Correspondingly, for matching each second end 474 of five spokes, five identical rectangular slots 444 are evenly placed in a circular pattern along the hub front exterior circumference 442 into the inside of the central hub 430, as particularly illustrated in FIGS. 11A and 12. Each rectangular slot 444 is transverse to a rotational axis 446 of the multi-piece wheel. In addition, first and second transverse bolt receiving holes 452 and 454 are arranged to penetrate through each rectangular slot from penetrating an outer arcuate surface 436 of the central hub 430, wherein two transverse bolt receiving holes turn into the threaded holes after crossing each slot 444. It will be appreciated that the first and second bolt receiving hole 452 and 454 of the central hub 430 match the respective first and second transverse bolt receiving hole 484 and 485 of each spoke 460. Therefore two bolts can be applied to affix each spoke at its second end to the central hub for assembling the embodiment 4 of the multi-piece wheel of the present invention.

The present invention has been described with several detailed embodiments and alternative embodiments to illustrate the fundamental principles of the present invention. The present invention is a new innovation in "custom wheel". The present invention allows the user to design his/her own wheel from any multiplicity of design patterns and any multiplicity of materials. Until the present invention, most wheels have been made of one or two materials combinations, steel and aluminum. In previous embodiments, a wheel was either cast, forged or milled out of a single piece of metal. In some cases, a steel outer ring was fabricated separately and the a central portion was attached to the outer portion either by welding it or bolting it. As discussed in detail above, the key innovation of the present invention is to make the components of the wheel out of separate interchangeable components.

In the embodiments, the central hub 30, 230, 330 and 430 can each be fabricated with different designs and lug holes patterns and different attach hole patterns. The spoke designs 60, 260, 360 and 460 can have many different designs. The outer wheel rings 10, 210, 310 and 410 can also be of many different designs. Each of the three components, central hub, spokes, and outer wheel ring can be made of material selected from the group consisting of steel, aluminum, magnesium, titanium, carbon and fiber. Therefore, the present invention allows the flexibility to mix and match designs and different materials so that each of the three components can be a different design and of a different.

The result of the present invention provides the following significant advantages:
1. The consumer has unlimited design options;
2. The consumer can exchange the spokes with another for a different look;
3. The consumer can replace a spoke without ever having to remove the wheel or the tire by just removing one spoke and replacing it with another;
4. The consumer can customize a wheel through different finishes, i.e. painting, engraving, plating, anodizing, powder coating, engraving, etching or other finishes;
5. Through the present invention the manufacturing process is facilitated and the cost of fabrication is reduce. Casting or fabricating smaller components is less expensive than casting or fabricating a larger component. Polishing a small component is also less expensive than polishing a larger component. Therefore, the smaller components of the present invention are less expensive to make than one large single component wheel known it the prior art; and
6. The consumer can save a lot of money by retaining the outer and the center hub and only purchasing the spokes.

When used in the claims, a multiplicity of spokes is defined as having at least two spokes. Of course, as illustrated, three, five or any number of spokes are within the spirit and scope of the definition of a multiplicity of spokes.

Defined in detail, the present invention is a multi-piece wheel, comprising: (a) an outer wheel ring having a generally circular cylindrical wall having a tire receiving inner surface and an outer circular surface to connect a respective outer and inner rim, a bolt receiving circular shoulder having an exterior circular cylindrical edge and a flat outer ring surface transversely affixed onto an outer circular surface adjacent to the outer rim of the outer wheel ring, wherein multiple identical exposed bolt receiving transverse threaded apertures are evenly spaced in a circular pattern to penetrate through the bolt receiving circular shoulder; (b) a multiplicity of identical spokes, which each spoke having a generally "T" shaped arcuate structure, comprising a round wide transverse first end having an outer arcuate end side and a flat inner side, the first end having a multiplicity of transverse bolt receiving holes, the spoke first end being connected to an intermediate arcuate elongated member having an arcuate outer and inner surface extending to an exterior side, the intermediate arcuate sections extending to a narrow second end of the spoke, the narrow second end is comprised of a rectangle having an elongated exterior end edge combined with a dovetail patterned member having a first and second side extending at an angle from a respective short rectangular right and left side toward each other, a first and second identical descending bolt receiving threaded hole being placed from an inner side to inside of the spoke second end; (c) a central hub which is a circular structure having a central bore comprising a rear cylindrical top circumference which extends outwardly to form a side circular arcuate surface further connected to a side cylindrical surface having a front exterior circumference, a front arcuate circular surfaces connected to the respective central bore and the front exterior circumference, wherein multiple identical lug nut receiving apertures are circumferentially spaced on the front circular arcuate surface close to the hub central bore, and multiple identical pockets having shapes which match the shapes of the spoke second ends are evenly arranged in a circular pattern on the front circular arcuate surface close to the front exterior circumference, wherein two descending bolt receiving holes penetrate through each pocket; and (d) each of the multiplicity of identical spokes respectively connected to the outer wheel ring and to the central hub in a manner which permits one or more of the spokes to be removed and replaced with another spoke so that the overall visual image of the wheel can be varied by replacing one or more of the identical spokes with a spoke of a different visual design but having the same components to enable it to be connected to the outer wheel ring and the central hub.

Defined more broadly, the present invention is a multi-piece wheel, comprising: (a) an outer wheel ring which is a generally circular cylindrical wall having a tire receiving inner surface and an outer circular surface, a bolt receiving circular shoulder transversely affixed onto the outer circular surface, a multiplicity of exposed bolt receiving transverse threaded apertures are evenly spaced in a circular pattern to penetrate through the bolt circular receiving shoulder; (b) a multiplicity of spokes, wherein each spoke is a generally arcuate structure comprising a round wide transverse first end having an outer arcuate end side and a flat inner side, with each spoke having a multiplicity of transverse bolt receiving holes, a spoke first end is connected to an intermediate arcuate elongated member having a narrow second end, a second end is comprised of a rectangle having an elongated exterior edge to combine with a dovetail patterned member having a first and second side extending at an angle from a respective short rectangular right and left side toward each other; (c) a central hub, which is a circular structure having a central bore comprising a rear cylindrical top circumference and a front arcuate circular surface having exterior circumference, wherein a multiplicity of lug nut receiving apertures are circumferentially spaced on the front surface close to the hub central bore, and a multiplicity of identical pockets are evenly arranged in a circular pattern on the front surface close to the exterior circumference; and (d) each of the multiplicity of spokes respectively connected to the outer wheel ring and to the central hub in a manner which permits one or more of the spokes to be removed and replaced with another spoke so that the overall visual image of the wheel can be varied by replacing one or more of the spokes with a spoke of a different visual design but having the same components to enable it to be connected to the outer wheel ring and the central hub.

Defined even more broadly, the present invention is a multi-piece wheel, comprising: (a) an outer wheel ring having spoke connecting means; (b) a multiplicity of spokes wherein each spoke is a generally elongated structure comprising a first end connected to an intermediate elongated member extending to a second end, the spoke connecting means of the outer wheel ring receiving a respective one of the first end of each spoke; (c) a central hub having a central bore and a body having connecting means to receive the respective second end of each of the multiplicity of spokes; (d) means to interconnect the multiplicity of spokes to the outer wheel; (e) means to interconnect the multiplicity of spokes to the central hub; and (f) each of the multiplicity of spokes respectively connected to the outer wheel ring and to the central hub in a manner which permits any or all of the outer wheel ring, one or more of the multiplicity of spokes and the central hub to be respectively replaced with a different outer wheel ring, spoke or central hub to provide a different visual appearance to the multi-piece wheel.

Defined most broadly, the present invention is a multi-piece wheel, comprising: (a) an outer wheel ring having spoke connecting means; (b) a multiplicity of spokes wherein each spoke is a generally elongated structure comprising a first end and a second end, the spoke connecting means of the outer wheel ring receiving a respective one of the first end of each spoke; (c) a central hub having a central bore and a body having connecting means to receive the respective second end of each of the multiplicity of spokes; (d) means to interconnect the multiplicity of spokes to the outer wheel; (e) means to interconnect the multiplicity of spokes to the central hub; and (f) each of the multiplicity of spokes respectively connected to the outer wheel ring and to the central hub in a manner which permits at least one of the outer wheel ring, one or more of the multiplicity of spokes, or the central hub to be respectively replaced with a different outer wheel ring, spoke or central hub to provide a different visual appearance to the multi-piece wheel.

Also defined most broadly, the present invention is a multi-piece wheel, comprising: (a) an outer wheel ring having spoke connecting means; (b) a multiplicity of spokes wherein each spoke is a generally elongated structure comprising a first end and a second end, the spoke connecting means of the outer wheel ring receiving a respective one of the first end of each spoke; (c) a central hub having a central bore and a body having connecting means to receive the respective second end of each of the multiplicity of spokes; (d) means to interconnect the multiplicity of spokes to the outer wheel; (e) means to interconnect the multiplicity of spokes to the central hub; and (f) each of the multiplicity of spokes, outer wheel ring and central hub are separately manufactured.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:

1. A multi-piece wheel, comprising:
   a. an outer wheel ring having a generally circular cylindrical wall having a tire receiving inner surface and an outer circular surface to connect a respective outer and inner rim, a bolt receiving circular shoulder having an exterior circular cylindrical edge and a flat outer ring surface transversely affixed onto an outer circular surface adjacent to the outer rim of the outer wheel ring, wherein multiple identical exposed bolt receiving transverse threaded apertures are evenly spaced in a circular pattern to penetrate through the bolt receiving circular shoulder;
   b. a multiplicity of identical spokes, which each spoke having a generally "T" shaped arcuate structure, comprising a rounded wide transverse first end having an outer arcuate end side and a flat inner side, the first end having a multiplicity of transverse bolt receiving holes, the spoke first end being connected to an intermediate arcuate elongated member having an arcuate outer and inner surface extending to a narrow second end of the spoke, the narrow second end is comprised of a rectangle having an elongated exterior end edge that is combined with a dovetail patterned member having a first and second side extending at an angle from the respective short rectangular right and left side edges of the rectangle toward each other, a first and second identical descending bolt receiving threaded hole being placed from an inner side to inside of the spoke second end;
   c. a central hub which is a circular structure having a central bore comprising a rear cylindrical top circumference which extends outwardly to form a side circular arcuate surface further connected to a side cylindrical surface having a front exterior circumference, a front arcuate circular surface of said central hub connected to the respective central bore and the front exterior circumference, wherein multiple identical lug nut receiving apertures are circumferentially spaced on the front circular arcuate surface close to the hub central bore, and multiple identical pockets having shapes which match the shapes of the spoke second ends are evenly arranged in a circular pattern on the front circular arcuate surface close to the front exterior circumference, wherein two descending bolt receiving holes penetrate through each pocket; and
   d. each of the multiplicity of identical spokes respectively connected to the outer wheel ring and to the central hub, wherein the second end of the spoke is affixed into the pocket so that the front arcuate surface of the central hub connects to the arcuate outer surface of the spoke to thereby form an extended convex surface for the wheel visual ornamentation, said affixation of the spoke that is further secured by two bolts connecting to the respective bolt receiving threaded holes positioned inside of the spoke second end provides additional wheel visual ornamentation, the connection of the spoke to the outer wheel ring and central hub is in a manner which permits one or more of the spokes to be removed and replaced with another spoke so that the overall visual image of the wheel can be varied by replacing one or more of the identical spokes with a spoke of a different visual design but having the same components to enable it to be connected to the outer wheel ring and the central hub.

2. The multi-piece wheel in accordance with claim 1 wherein the central hub is replaceable with a central hub of a different visual design.

3. The multi-piece wheel in accordance with claim 1 wherein the outer wheel ring is replaceable with another outer wheel ring having a different visual design.

4. The multi-piece wheel in accordance with claim 1 wherein the spokes are manufactured out of material selected from the group consisting of steel, aluminum, magnesium, titanium, carbon, and fiber.

5. The multi-piece wheel in accordance with claim 1 wherein the central hub is manufactured out of material selected from the group consisting of steel, aluminum, magnesium, titanium, carbon, and fiber.

6. The multi-piece wheel in accordance with claim 1 wherein the outer wheel ring is manufactured out of material selected from the group consisting of steel, aluminum, magnesium, titanium, carbon, and fiber.

7. A multi-piece wheel, comprising:
   a. an outer wheel ring which is a generally circular cylindrical wall having a tire receiving inner surface and an outer circular surface, a bolt receiving circular shoulder transversely affixed onto the outer circular surface, a multiplicity of exposed bolt receiving transverse threaded apertures are evenly spaced in a circular pattern to penetrate through the bolt circular receiving shoulder;
   b. a multiplicity of spokes, wherein each spoke is a generally arcuate structure comprising a rounded wide transverse first end having an outer arcuate end side and a flat inner side, with each spoke having a multiplicity of transverse bolt receiving holes, a spoke first end is connected to an intermediate arcuate elongated member having a narrow second end, the second end is comprised of a rectangle having an elongated exterior edge that is combined with a dovetail patterned member having a first and second side extending at an angle from the respective short rectangular right and left side edges of the rectangle toward each other;

c. a central hub, which is a circular structure having a central bore comprising a rear cylindrical top circumference and a front arcuate circular surface having an exterior circumference, wherein a multiplicity of lug nut receiving apertures are circumferentially spaced on the front surface close to the hub central bore, and a multiplicity of identical pockets are evenly arranged in a circular pattern on the front surface close to the exterior circumference; and d. each of the multiplicity of spokes respectively connected to the outer wheel ring and to the central hub, wherein the second end of the spoke is affixed into the pocket so that the front arcuate surface of the central hub connects to the intermediate arcuate elongated member of the spoke to thereby form an extended convex surface for the wheel visual ornamentation, the connection of the spoke to the outer wheel ring and central hub is in a manner which permits one or more of the spokes to be removed and replaced with another spoke so that the overall visual image of the wheel can be varied by replacing one or more of the spokes with a spoke of a different visual design but having the same components to enable it to be connected to the outer wheel ring and the central hub.

8. The multi-piece wheel in accordance with claim 7 wherein the central hub is replaceable with a central hub of a different visual design.

9. The multi-piece wheel in accordance with claim 7 wherein the outer wheel ring is replaceable with another outer wheel ring having a different visual design.

10. The multi-piece wheel in accordance with claim 7 wherein the spokes are manufactured out of material selected from the group consisting of steel, aluminum, magnesium, titanium, carbon, and fiber.

11. The multi-piece wheel in accordance with claim 7 wherein the central hub is manufactured out of material selected from the group consisting of steel, aluminum, magnesium, titanium, carbon, and fiber.

12. The multi-piece wheel in accordance with claim 7 wherein the outer wheel ring is manufactured out of material selected from the group consisting of steel, aluminum, magnesium, titanium, carbon, and fiber.

13. A multi-piece wheel, comprising:
a. an outer wheel ring having spoke connecting means;
b. a multiplicity of spokes wherein each spoke is a generally elongated arcuate structure having an arcuate outer surface comprising a first end connected to an intermediate elongated member extending to a second end, the spoke connecting means of the outer wheel ring receiving a respective one of the first end of each spoke;
c. a central hub having a central bore and a body having a front arcuate circular surface having connecting means to receive the respective second end of each of the multiplicity of spokes;
d. means for interconnecting the multiplicity of spokes to the outer wheel ring;
e. means for interconnecting the multiplicity of spokes to the central hub; and
f. each of the multiplicity of spokes respectively connected to the outer wheel ring and to the central hub, wherein the second end of the spoke is affixed into the connecting means to thereby form an extended convex shaped outer surface that connects the arcuate outer surface of the spoke to the front arcuate circular surface of said central hub so that the connection is not visible to thereby provide for visual ornamentation of the wheel, the connection of the spoke to the outer wheel ring and central hub is in a manner which permits any or all of the outer wheel ring, one or more of the multiplicity of spokes and the central hub to be respectively replaced with a different outer wheel ring, spoke or central hub to provide a different visual appearance to the multi-piece wheel.

14. The multi-piece wheel in accordance with claim 13 wherein the spokes are manufactured out of material selected from the group consisting of steel, aluminum, magnesium, titanium, carbon, and fiber.

15. The multi-piece wheel in accordance with claim 13 wherein the central hub is manufactured out of material selected from the group consisting of steel, aluminum, magnesium, titanium, carbon, and fiber.

16. The multi-piece wheel in accordance with claim 13 wherein the outer wheel ring is manufactured out of material selected from the group consisting of steel, aluminum, magnesium, titanium, carbon, and fiber.

17. A multi-piece wheel, comprising:
a. an outer wheel ring having spoke connecting means;
b. a multiplicity of spokes wherein each spoke is a generally elongated arcuate structure having an arcuate outer surface comprising a first end and a second end, the spoke connecting means of the outer wheel ring receiving a respective one of the first end of each spoke;
c. a central hub having a central bore and a body having a front arcuate circular surface having connecting means to receive the respective second end of each of the multiplicity of spokes;
d. means for interconnecting the multiplicity of spokes to the outer wheel ring;
e. means for interconnecting the multiplicity of spokes to the central hub; and
f. each of the multiplicity of spokes respectively connected to the outer wheel ring and to the central hub, wherein the second end of the spoke is affixed into the connecting means to thereby form an extended convex shaped outer surface that connects the arcuate outer surface of the spoke to the front arcuate circular surface of said central hub so that the connection is not visible to thereby provide for visual ornamentation of the wheel, the connection of the spoke to the outer wheel ring and central hub is in a manner which permits at least one of the outer wheel ring, one or more of the multiplicity of spokes, or the central hub to be respectively replaced with a different outer wheel ring, spoke or central hub to provide a different visual appearance to the multi-piece wheel.

18. A multi-piece wheel, comprising:
a. an outer wheel ring having spoke connecting means;
b. a multiplicity of spokes wherein each spoke is a generally elongated arcuate structure having an arcuate outer surface comprising a first end and a second end, the spoke connecting means of the outer wheel ring receiving a respective one of the first end of each spoke;
c. a central hub having a central bore and a body having a front arcuate circular surface having connecting means to receive the respective second end of each of the multiplicity of spokes;

d. means for interconnecting the multiplicity of spokes to the outer wheel ring;

e. means for interconnecting the multiplicity of spokes to the central hub, means for providing visual ornamentation of the wheel comprising a plurality of extended convex shaped outer surfaces, wherein each surface is formed from a connection of the arcuate outer surface of the spoke to the front arcuate circular surface of said central hub member; and f. each of the multiplicity of spokes, outer wheel ring and central hub are separately manufactured.

19. The multi-piece wheel in accordance with claim 18 wherein the outer wheel ring, multiplicity of spokes and central hub are each manufactured out of material selected from the group consisting of steel, aluminum, magnesium, titanium, carbon, and fiber.

* * * * *